United States Patent [19]

Tyler et al.

[11] 3,983,760

[45] Oct. 5, 1976

[54] CONTROL APPARATUS HAVING OVERTRAVEL MEANS

[75] Inventors: Henry P. Tyler; Joseph L. Peczkowski; Frank J. O'Keefe, all of South Bend, Ind.

[73] Assignee: The Bendix Corporation, South Bend, Ind.

[22] Filed: May 12, 1975

[21] Appl. No.: 576,413

[52] U.S. Cl. .................. 74/99 A; 74/107; 74/470; 92/13.1; 92/13.5; 92/13.7; 92/129

[51] Int. Cl.[2] .................. F15B 15/24; F16H 21/44; F16J 1/10

[58] Field of Search .................. 92/13.1, 13.5, 13.7, 92/29, 129, 140; 251/78; 74/99 A, 107, 470

[56] References Cited

UNITED STATES PATENTS

| | | | |
|---|---|---|---|
| 1,518,634 | 12/1924 | Cason, Jr. | 74/470 X |
| 1,625,457 | 4/1927 | Dapron | 92/84 X |
| 2,814,310 | 11/1957 | Lower | 92/13.5 X |
| 2,893,752 | 7/1959 | May | 251/78 X |
| 3,252,303 | 5/1966 | Weasler et al. | 64/29 |
| 3,793,925 | 2/1974 | Collin | 92/13.1 |
| 3,905,241 | 9/1975 | Downing et al. | 74/470 |

*Primary Examiner*—Irwin C. Cohen
*Attorney, Agent, or Firm*—William N. Antonis

[57] ABSTRACT

A lever mechanism having an output end and an input end wherein the input end is pivotally mounted to a fixed support and provided with a track portion. The track portion has a spaced apart relationship to the pivot axis of the lever and is provided with a generally V-shaped portion and lateral side portions oppositely extending therefrom. A reference force is applied through a roller member which is positioned along the track by a variable input position signal applied thereto. The apex of the V-shaped portion is on a line through the pivot axis such that with the roller member held in a bottomed position and engaging both sides of the V-shaped portion there is no input moment applied to the lever mechanism and movement of the roller member in either direction from a null position produces a clockwise or counterclockwise motion of the output end of the lever mechanism, depending upon the direction of movement of the output end in response to the roller movement. Engagement of the output end with one of the stops prevents further motion of the lever mechanism and permits the roller member to ride up the corresponding inclined side of the V-shaped portion and along the lateral side portion extending therefrom against the resistance of the reference force thereby allowing overtravel of the roller member in response to the input position signal.

9 Claims, 5 Drawing Figures

INPUT SIGNAL

CONTROL APPARATUS HAVING OVERTRAVEL MEANS

BACKGROUND OF THE INVENTION

In control apparatus of the lever type wherein a variable input position is converted to an output position which varies as a function of the input position within predetermined limits, it is sometimes desired to establish limits to the output position which limits may be held constant or made variable as a function of selected conditions of operation. Other desirable control features may include response to low input force signals, accuracy, structural ruggedness and minimum friction force losses over a selected operating range. Additional desirable features may include a force preload which is constant or variable as a function of a selected condition of operation as well as the features of compactness and/or lightweight.

Various prior art control devices may be found which have a limited number of the above-mentioned desirable characteristics. Reference is made to U.S. Pat. No. 3,232,179 and 3,393,606 for examples of such prior art desired. However, we are not aware of any prior art control devices which embody all of the heretofore mentioned desirable features.

SUMMARY OF THE INVENTION

It is an object of the present invention to provide a control device particularly adapted to provide an output position signal in response to an input position signal wherein predetermined limits are established on the output position signal with subsequent overtravel of the input position signal.

It is another object of the present invention to provide a control device for controlling a positionable output member between predetermined limits accurately and positively in response to a positionable input member.

It is an important object of the present invention to provide a control device for controlling a positionable output member within predetermined limits in response to a positionable input member wherein the force requirement for actuation is minimized.

Other objects and advantages of the present invention will be apparent from the following description and accompanying drawings.

DESCRIPTION OF THE PREFERRED EMBODIMENT

Figure 1:
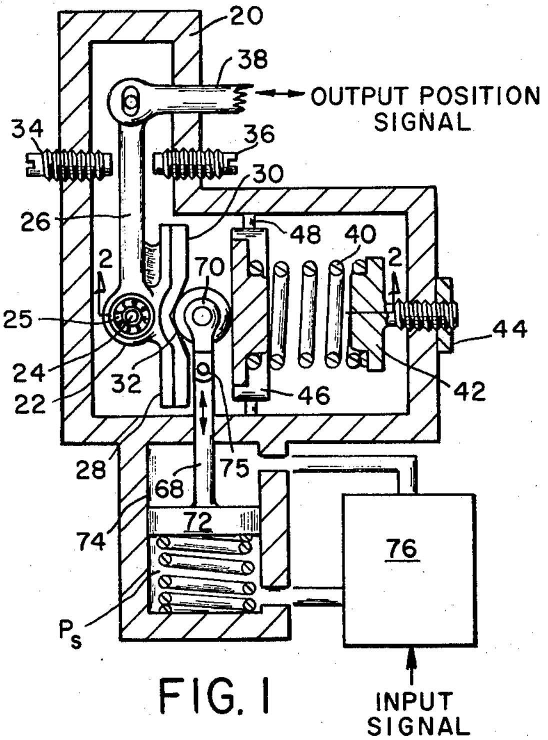
FIG. 1 is a schematic representation of the present invention.
Figure 2:
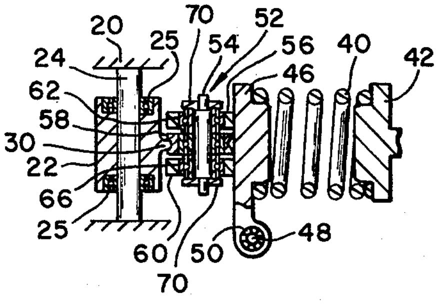
FIG. 2 is a section view taken on line 2—2 of FIG. 1.

Referring to FIGS. 1 and 2, in particular, numeral 20 designates a casing adapted to house a lever member 22 pivotally secured to a fixed support 24 by anti-friction bearing member 25. The lever member 22 is provided with an output arm portion 26. An input force table 28 integral with arm portion 26 is generally rectangular in form and provided with a rib or track 30 thereon. The rib or track 30 is spaced midway between the longitudinal edges of table 28. The mid-portion of rib or track 30 is provided with a notch 32 formed in a V-shape with the inclined side portions thereof converging towards the pivot axis of lever member 22. The notch 32 is bisected by a line passing through the pivot axis of lever member 22.

A pair of spaced apart manually adjustable stop members 34 and 36 threadely engaged with casing 20 are adapted to be engaged by arm portion 26 to thereby limit the degree of pivotal movement about the support 24 in either direction from the position shown in FIG. 1. The output end of arm portion 26 may be pivotally connected to a link 38-which, in turn, is connected at its opposite end to a controllable member, not shown, such as a positionable fluid serve valve or the like thereby causing the controllable member to assume a position dependent upon the output position of the arm portion 26.

A force imposed upon lever member 22 is derived from a coil spring 40 interposed between a manually adjustable spring retainer 42 threadedly engaged with casing 20 and provided with a lock nut 44 and a platform or table 46 which is pivotally secured to a fixed support 48 by suitable anti-friction bearing members 50.

The output force of spring 40 is imposed on track 30 via a force transmitting roller assembly generally indicated by 52. The roller assembly 52 includes a shaft 54 upon which are mounted three spaced apart roller members 56, 58 and 60 by means of associated anti-friction bearing members 62, 64 and 66 respectively. A movable input shaft 68 having a yoke portion 70 secured to shaft 54 is actuated in the direction of the arrows shown by conventional actuating means responsive to a sensed condition of operation which actuating means may include a fluid pressure actuated piston 72 slidably carried in a cylinder 74 and responsive to a controlled servo fluid pressure $P_s$. The yoke portion 70 is pivotally secured to shaft 68 by a pin 75 which permits the roller assembly 52 to swing relative to shaft 68. The controlled servo fluid pressure $P_s$ is caused to vary in relation to sensed condition of operation by conventional control means generally indicated by 76. The roller members 56 and 60 bear against table 46 and roller member 58 bears against rib or track 30. The pivotal axis of platform or table 46 is parallel to the path of movement of roller members 56 and 60 riding against table 46 such that the position of the roller members 56 and 60 has no effect on the lever arm of table 46 through which the spring 40 acts thereby establishing a constant preload against roller members 56 and 60. The roller member 58 is provided with a peripheral groove 78 adapted to receive track 30 which guides the same.

In operation, as shown in FIG. 1, the roller member 58 is forcibly urged to a bottomed position in notch 32 by spring 40 acting through table 46, roller members 56 and 60 and shaft 54 thereby establishing a neutral position of output arm position 26 between stop members 34 and 36. It will be understood that, in a bottomed position of roller member 58 in notch 32, the summation of moments about the pivot axis of lever member 22 is zero resulting in a corresponding stable position of output arm portion 26.

Assuming that the condition of operation sensed by means 76 creates a change in pressure $P_s$ causing an increment of movement of piston 72 to the right as viewed in FIG. 1, the input shaft 68 and thus roller assembly 52 moves accordingly whereupon roller member 58 attempts to move up the inclined side portion of notch 72 against the resistance of spring 40. However, the spring force acting against roller member 58 is not overcome resulting in pivotal movement of input table 28 about support 24 to compensate for the position change of roller member 58. The degree of pivotal movement of input table 28 is dependent upon a number of structural conditions, namely, the distance from the axis of support 24 to the axis of shaft 54 which may be varied, as desired, by increasing or decreasing the distance from the axis of support 24 to the point of contact of roller member 58 with track 30 and/or the radius of roller member 58 as well as the angle of inclination of the side portions of notch 32. The output arm portion 26 being integral with input table 28 pivots equally and moves toward stop member 36. The degree of movement of the output end of arm portion 26 is dependent upon the lever arm ratio between the input table 28 and arm portion 26 relative to the common axis defined by support 24 and may be selected to meet desired conditions of operation.

Figure 5:
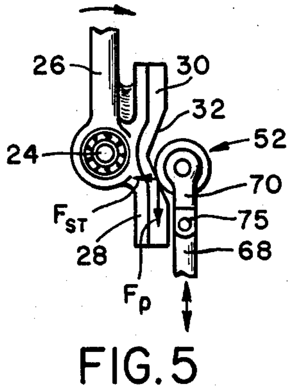

Each incremental movement of roller member 58 to the right in the above-mentioned manner in response to a change in the sensed condition of operation causes the input table 28 to pivot accordingly in a clockwise direction to establish a corresponding position of arm portion 26. Depending upon the desired range of response of output arm portion 26 to the sensed condition of operation, the manually adjustable stop member 36 may be adjusted such that, at a predetermined sensed condition of operation, the output arm portion 26 will contact stop member 36 thereby preventing further clockwise movement of the arm portion 26 as well as input table 28. With arm portion 26 against stop member 36 overtravel or further movement of input shaft 68 toward the right will cause roller member 58 to ride up the inclined side portion of notch 32 against the resistance of spring 40, thereby imposing the spring 40 force applied against roller member 58 on the inclined side portion which, in turn, results in a clockwise torque about the pivot axis defined by support 24 as indicated by the force vectors $F_v$ and $F_{st}$ in FIG. 5. The clockwise torque thus generated holds arm portion 26 against stop member 36. Upon reaching the end of the inclined side portion of notch 32, further rightward movement of input shaft 68 results in roller member 58 riding along the straight section of track 30 which, by virtue of the heretofore mentioned angular position of input table diverges relative to table 46. As the roller member 58 moves away from notch 32, it is held trapped between track 30 and table 46 by the gradually extending spring 40 which results in a progressively decreasing force resisting movement of input shaft 68. Thus for large overtravel positions of roller member 58 the piston 72 may be unloaded to a desired extent.

Figure 4:
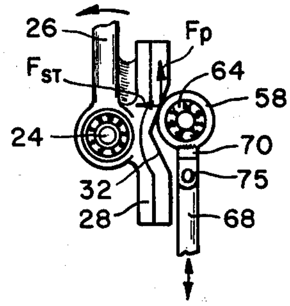
FIGS. 4 and 5 show a portion of the structure of FIG. 1 with the input force signal applied at different points on the lever mechanism during overtravel conditions.

It will be recognized that movement opposite to that described above of the roller member 58 from its bottomed position in notch 32 in response to a change in the sensed condition of operation in the opposite sense will result in counterclockwise movement of input table 28 as well as output arm portion 26. Upon engagement of arm portion 26 with stop member 34, overtravel of the input shaft 68 is permitted in the same manner as described above resulting in a counterclockwise torque as indicated in FIG. 4.

Figure 3:
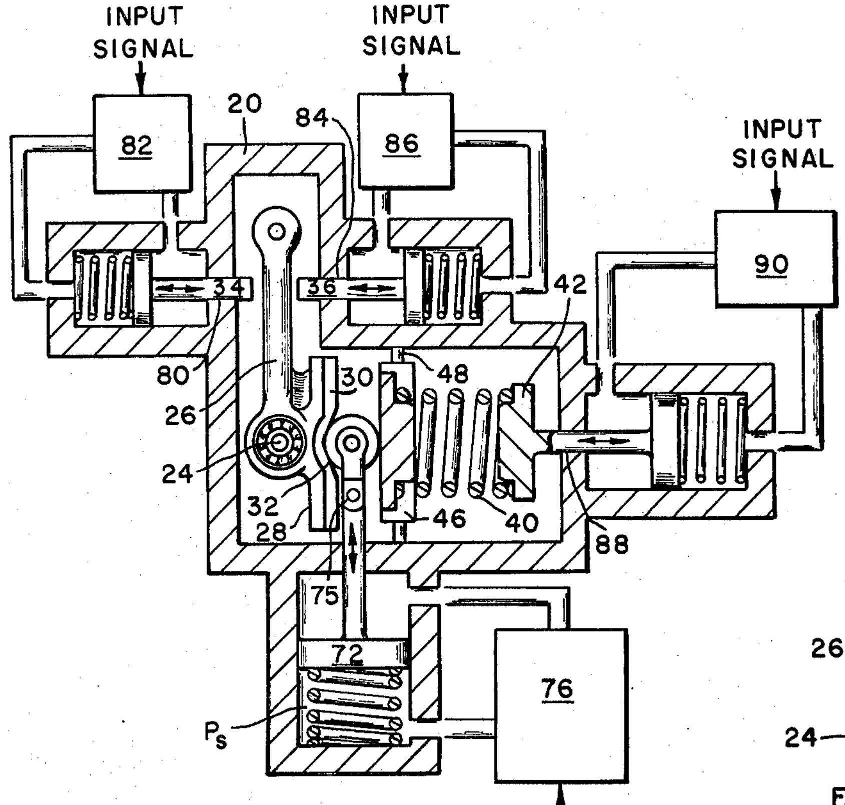
FIG. 3 is a modified form of the structure shown in FIG. 1 wherein additional control parameters may be introduced into the control network.

Referring to FIG. 3, a modified form of the apparatus of FIG. 1 is shown wherein common elements are identified by the same numeral. Specifically, the modified form of FIG. 3 involves the making of stop members 34 and 36 adjustable in response to selected variable conditions of operation as well as making the preload or reference force imposed by spring 40 adjustable in response to a selected condition of operation.

In FIG. 3, the stop member 34 is made slidably adjustable in an opening 80 in casing 20 and actuated by conventional servo mechanism generally indicated by 82 in response to a selected condition of operation such as variable temperature or pressure of an engine to be controlled. It will be understood that the servo mechanism 82 is capable of holding the stop member 34 in position against the force imposed by arm portion 26 bearing thereagainst thereby providing a positive stop against further movement of arm portion 26.

The stop member 36, like stop member 34, is adjustable and slidably carried in an opening 84 in casing 20. Conventional servo mechanism generally indicated by 86 and responsive to a selected variable condition of operation such as a temperature or pressure is connected to actuate stop member 36 and provides a positive stop against further movement of arm portion 26 when engaged thereby.

The spring load imposed by spring 40 against table 46 is made variable by making the spring retainer 42 slidable in an opening 88 in casing 20. Conventional servomechanism or other suitable actuating means 90 responsive to a suitable variable condition of operation is connected to actuate the spring retainer 42 thereby increasing or decreasing the effective spring load exerted by spring 40 against roller member 58.

It will be recognized by those persons skilled in the art that various changes and modifications in the above described structure may be made without departing from the scope of applicants' invention as defined by the following claims.

We claim:

1. Control apparatus comprising:
- an axially movable input member;
- a movable output member;
- lever means pivotally mounted on a first fixed support and provided with input and output portions;
- a notch of general V-shape in said input portion and bisected by a line perpendicular to and intercepting the pivotal axis of said lever means;
- roller means abutting said notch;
- said roller means being rotabably connected to and actuated by said input member;
- said output member being connected to said output portion of said lever means;
- force producing means bearing against said roller means for overcoming the tendency of said roller means to move out of a bottomed position in said notch in response to movement of said input member thereby causing said lever means to pivot about said fixed support to a predetermined degree dependent upon the movement of said roller means in response to said input member; and
- stop means engageable by said lever means for limiting pivotal movement thereof whereupon said roller means is actuated by said input member along an inclined side portion of said notch in opposition to said force producing means to permit overtravel of said roller means and input member.

2. Control apparatus as claimed in claim 1 wherein:

said lever means has a neutral position for a given position of said input member;

said stop means is defined by spaced apart first and second stop members for limiting pivotal movement of said lever means in either direction from said neutral position.

3. Control apparatus as claimed in claim 1 wherein:

said input portion is defined by a table surface having a spaced relation to said fixed support and provided with a track portion having said notch at a midportion thereof and oppositely directed straight sections extending from said notch;

said roller means is operatively engaged with said track portion and guided thereby.

4. Control apparatus as claimed in claim 1 wherein:

said force producing means includes a platform pivotally secured to a second fixed support and bearing against said roller means; and a spring member interposed between said platform and an adjustable spring retainer for generating a reference force;

means operatively connected to said spring retainer for adjusting the same to establish a corresponding predetermined value of said reference force for each position of said spring retainer;

said roller means moves in a direction parallel to the pivot axis defined by said second fixed support.

5. Control apparatus as claimed in claim 1 wherein:

the summation of moments about said pivotal axis defined by said first support is zero providing said roller means remains bottomed in said notch.

6. Control apparatus as claimed in claim 1 wherein:

said stop means is adjustable and positioned by actuating means.

7. Control apparatus as claimed in claim 4 wherein:

said adjustable spring retainer is positioned by actuating means to vary said reference force applied to said platform.

8. Control apparatus as claimed in claim 1 wherein:

said stop means are manually adjusted to provide a desired spaced apart relationship thereof.

9. Control apparatus as claimed in claim 1 wherein:

said lever means and said roller means are provided with anti-friction bearing means operatively connected thereto for minimizing frictional resistance to movement thereof.

* * * * *